July 27, 1943.  C. E. BANNISTER  2,325,464

HOSE

Filed Sept. 3, 1940 2 Sheets-Sheet 1

INVENTOR
Clyde E. Bannister
BY
Willard D. Eskin
ATTORNEY

Patented July 27, 1943

2,325,464

UNITED STATES PATENT OFFICE 2,325,464

HOSE

Clyde E. Bannister, Bartlesville, Okla.

Application September 3, 1940, Serial No. 355,112

3 Claims. (Cl. 285—22)

This invention relates to multiple-passage hose and to fluid-conducting hose adapted to sustain a heavy lengthwise strain as in supporting in an earth-boring a fluid actuated motor supplied with motive fluid by the hose and actuating a mechanism such as a bit or a pump.

Its chief objects are to provide a line of hose consisting of a plurality of lengths or sections securely coupled together and adapted to support a heavy weight; to provide for the convenient coupling and uncoupling of lengths of hose each having a plurality of flow passages; to provide the above advantages without excessive over-all diameter for the assembly; to provide a hose having lightness of construction with adequate bursting strength for the parts defining a plurality of flow passages; to provide for convenient and economical reeling of the hose into and out of an earth-boring, for example; to provide improved connections for supplying or receiving fluid from a plurality of flow passages in the same hose structure; to provide such connections adapted to function while the hose is being wound upon or unwound from a reeling device; and to provide other advantages which will be manifest in the following description.

Figures 1, 2:
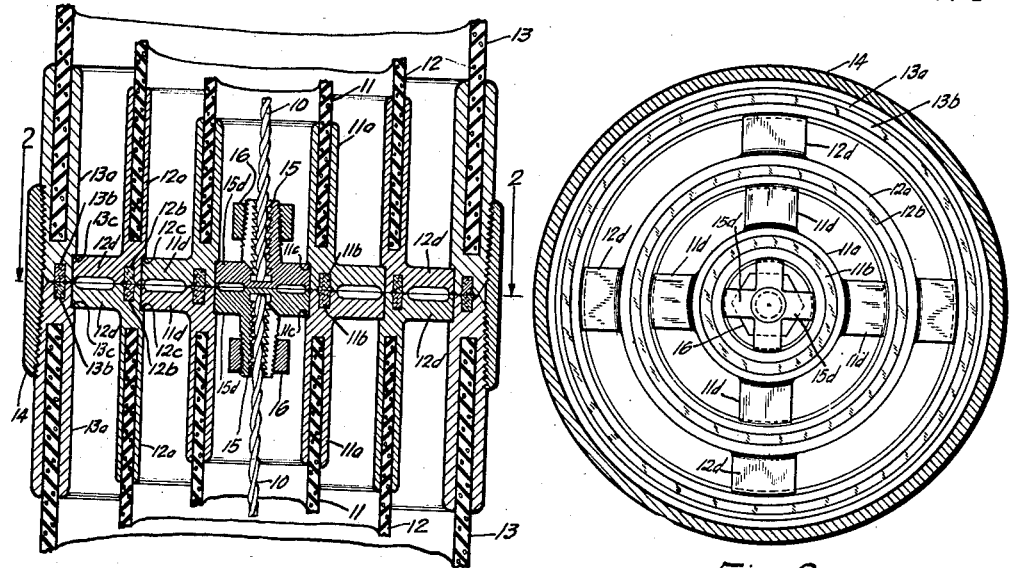
Fig. 1 is a middle, longitudinal section of a multiple-passage hose embodying my invention in its preferred form, cable-lengths constituting parts of the structure being shown in elevation.
Fig. 2 is a section on line 2—2 of Fig. 1.

Referring to the drawings, and at first to Figs. 1 and 2, the particular hose chosen to be shown here for purposes of illustration and not of limitation has three fluid passages which in each length of hose is defined by a central supporting cable 10, an inner hose tube 11 spaced from and surrounding the cable, an intermediate hose tube 12 spaced from and surrounding the inner hose tube 11, and an outer hose tube 13 spaced from and surrounding the intermediate hose tube 12.

These hose tubes preferably are of graduated wall thicknesses as shown, the outer tube being of the greatest wall thickness, for strength, because it is subjected to high strain not only because of its relatively large diameter but also because the pressure of fluid next within it may be to only a relatively small extent offset by atmospheric pressure or, near the top of the well, only a small head of water or drilling fluid, whereas the pressures on opposite faces of the walls of the other tubes are more nearly equalized and also those tubes are subjected to lighter strain, other things being equal, by reason of their relatively small diameters.

Swedged upon each end of each length 13 of the outer hose tube is a coupling ring or double-walled sleeve 13a provided with a gasket 13b and formed with an internal annular shoulder 13c and with external threads for engagement by an annular coupling 14.

Similarly each end of each length of the intermediate hose tube 12 has swedged thereon a coupling ring or double-walled sleeve 12a provided with a gasket 12b and formed with an internal annular shoulder 12c and also with radiating spider arms 12d adapted to seat at their outer ends upon the annular shoulder 13c of the outer tube's coupling ring 13a.

Likewise each end of each length of the inner hose tube 11 has swedged thereon a coupling ring or double-walled sleeve 11a provided with a gasket 11b and formed with an internal annular shoulder 11c and with radiating spider arms 11d adapted to seat against the annular shoulder 12c of the intermediate tube's coupling ring 12a.

Each end of each length of cable 10 has secured thereon a taper-jaw end-fitting 15 the toothed jaws of which are sprung against the cable by a taper-threaded nut 16 and each of the end-fittings 15 is formed with radiating spider arms 15d adapted to seat against the annular shoulder 11c of the coupling ring 11a of the inner hose tube 11.

In the assembling of these parts the coupling rings 13a are mounted on the two ends of the hose length 13 and a coupling ring 12a is mounted on one end of the hose length 12 and the other end of the hose length 12 is passed into and through the hose length 13 until the spider arms 12d engage the shoulder 13c at the first mentioned end. The hose length 12 is then stretched or the hose length 13 is compressed lengthwise, or both, to cause the unequipped end of the length 12 to protrude from the length 13 and while it so protrudes the second coupling ring 12a is mounted upon it. Upon release of the two hose lengths the spider arms 12d of the last applied coupling ring 12a seat snugly against the adjacent shoulder 13c, by reason of the recoil of the hose lengths.

The inner hose length 11 and the cable length 10 are incorporated in the assembly in the same way, in succession, except that the cable 10 is not adapted to stretch very substantially, which makes it necessary to obtain protrusion of its last-equipped end chiefly by lengthwise compression of the assembled hose lengths.

A series of the composite lengths of hose are then coupled by means of threaded couplings such as the coupling 14 and the resulting line of hose is manipulated as desired.

Figure 3:
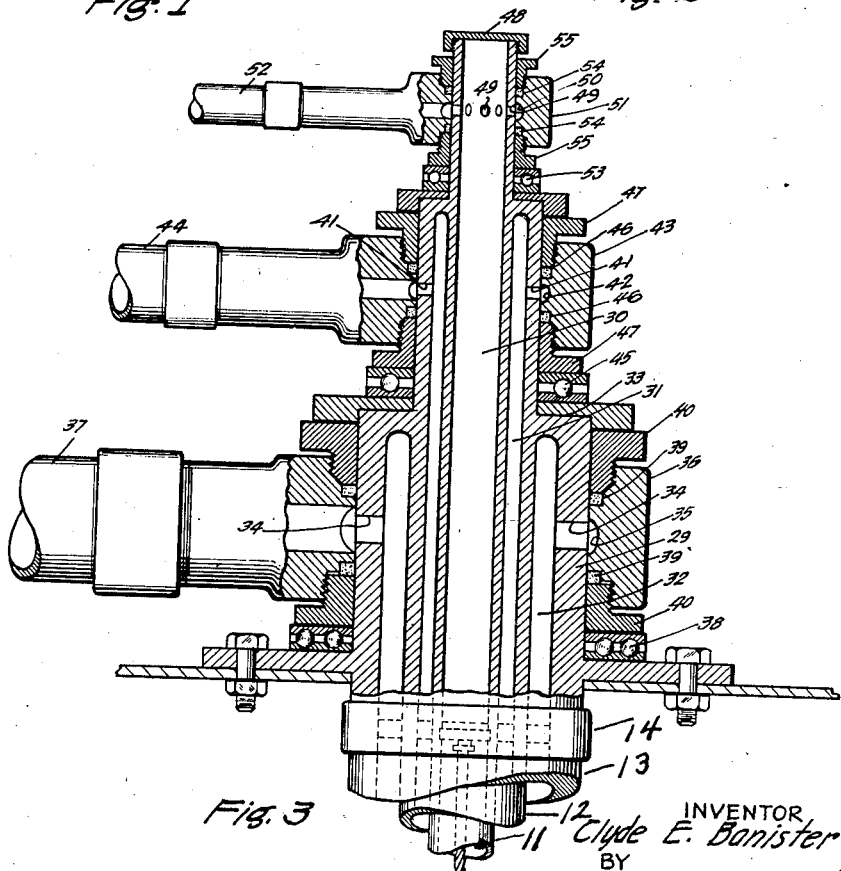
Fig. 3 is a break-away middle section of a multiple-passage end fitting for the hose and swivel connections for supplying fluid to or receiving fluid from the several passages of the hose.
Figure 4:
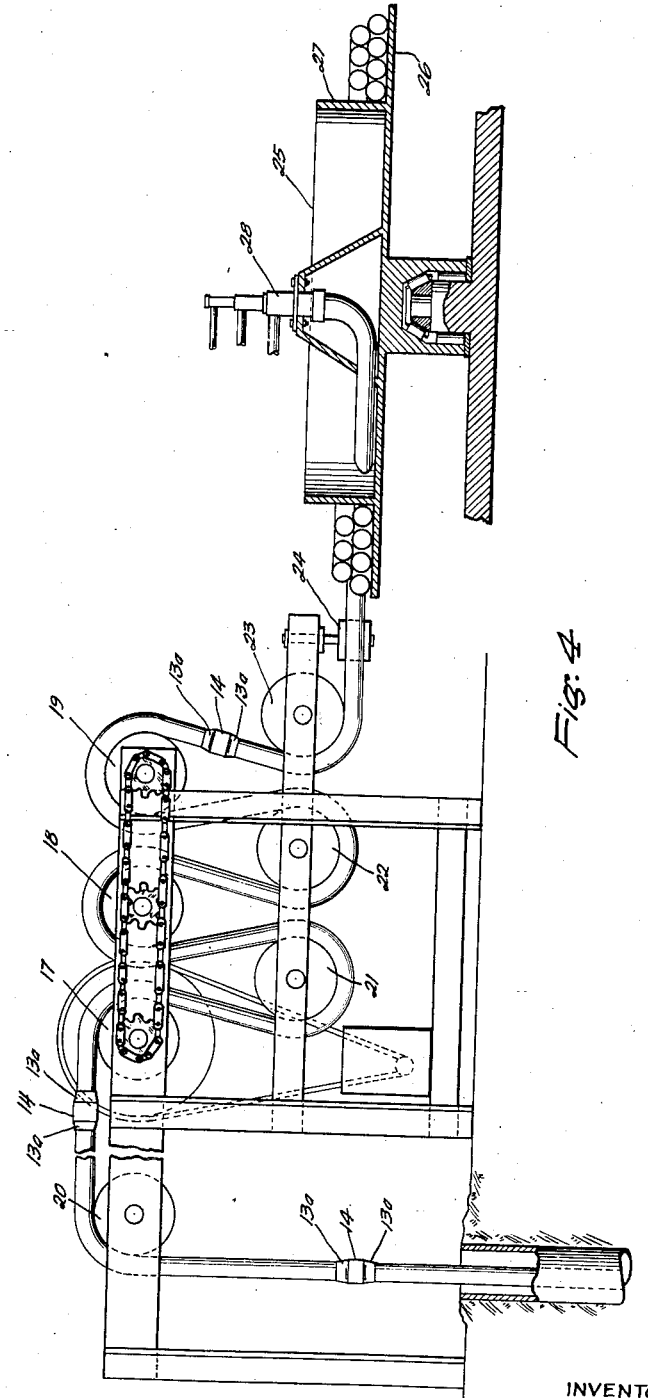
Fig. 4 is an elevation of a pull-out and reeling assembly in association with the hose.

Figs. 3 and 4 show convenient end fittings and apparatus for use of the hose for well-drilling or well-pumping purposes, for example.

In Fig. 4 is shown a series of driven pull-out and hold-back rolls 17, 18, 19 and guide rolls 20 to 24 cooperating with a hose reel 25, here shown as a vertical-axis reel and comprising a turntable having a horizontal, annular hose-supporting portion 26 and a vertical flange or spool portion 27 against which the hose is wound.

For supplying fluid to or receiving fluid from the several passages of the hose while permitting it to be reeled onto or off of the turn-table a swivel type end-fitting 28 is provided.

It is shown in detail in Fig. 3. Preferably it comprises a unitary casting 29 formed with passages 30, 31 and 32 communicating with the respective passages of the hose, the casting being coupled to the upper end of the adjacent hose section, inclusive of the cable section 10, in the same manner as the upper hose section in Fig. 1 is coupled to the lower hose section in that figure.

The outermost passage 32 of the casting extends upward only part way of the casting, in a large-diameter part of the latter which terminates at a shoulder 33, and the outer wall of this passage is formed with apertures 34, 34 through which the passage is in communication with an annular internal groove 35 formed in a distributor ring 36 which surrounds the casting and is in communication with a stationary conduit 37.

The distributor ring 36 is provided with a supporting bearing 38, packing rings 39, 39 and packing nuts 40, 40.

Similarly the intermediate passage 31 extends only part way to the top of the casting, in a portion thereof of intermediate diameter, and through ports 41, 41 and an internal annular groove 42 in a distributor ring 43 it is in communication with a stationary conduit 44. The distributor ring 43 is provided with a supporting bearing 45, packing rings 46, 46 and packing nuts 47, 47.

The innermost passage 30 extends to the top of the casting, where it is closed by a screw-cap 48, and through ports 49, 49 and an internal annular groove 50 in a distributor ring 51 it is in communication with a stationary conduit 52. The distributor ring 51 is provided with a supporting bearing 53, packing rings 54, 54 and packing nuts 55, 55.

The construction as described provides the several advantages set out in the above statement of objects and various modifications are possible within the scope of the appended claims.

I claim:

1. A hose comprising two flexible tubes mounted one within the other and thus defining two fluid-conducting passages, respective end-fittings mounted upon adjacent ends of the said tubes, one of said end-fittings being formed with a stop surface against which the other seats by simple axial, non-rotary movement, and a fluid-conducting member coupled to said end-fittings and having two fluid passages communicating respectively with the first-mentioned passages.

2. A hose comprising two flexible tubes mounted one within the other and thus defining two fluid-conducting passages, respective end-fittings mounted upon adjacent ends of the said tubes, one of said end-fittings being formed with a stop-surface against which the other seats by simple axial, non-rotary movement, a flexible tension element mounted within at least one of said tubes and anchored to one of said end-fittings, and a fluid conducting member coupled to said end-fittings and having two fluid passages communicating respectively with the first-mentioned passages.

3. A hose comprising two flexible tubes mounted one within the other and thus defining two fluid-conducting passages, respective end-fittings mounted upon adjacent ends of the said tubes, one of said end-fittings being formed with a stop-surface against which the other seats by simple axial, non-rotary movement, a flexible tension element mounted within at least one of said tubes and anchored to one of said end-fittings, and a fluid conducting member coupled to said end-fittings and having two fluid passages communicating respectively with the first-mentioned passages, said tension element being provided with an end attachment which by simple axial non-rotary movement seats against a stop surface of the end-fitting to which the element is anchored and thus anchors it.

CLYDE E. BANNISTER.